US011373146B1

(12) United States Patent
Yerastov et al.

(10) Patent No.: US 11,373,146 B1
(45) Date of Patent: Jun. 28, 2022

(54) JOB DESCRIPTION GENERATION BASED ON MACHINE LEARNING

(71) Applicant: SkyHive Technologies Inc., Vancouver (CA)

(72) Inventors: Yuri Yerastov, San Mateo, CA (US); Mohan Reddy, Fremont, CA (US); Sean Thomas Hinton, Vancouver (CA); Mykhailo Timonin, Vancouver (CA); Sergey Bukharov, Vancouver (CA); Rupert Cosulich, Vancouver (CA)

(73) Assignee: SKYHIVE TECHNOLOGIES INC., Vancouver (CA)

( * ) Notice: Subject to any disclaimer, the term of this patent is extended or adjusted under 35 U.S.C. 154(b) by 0 days.

(21) Appl. No.: 17/364,699

(22) Filed: Jun. 30, 2021

(51) Int. Cl.
*G06Q 10/10* (2012.01)
*G06F 40/20* (2020.01)
*G06N 20/00* (2019.01)
*G06N 5/02* (2006.01)
*G06F 40/30* (2020.01)

(52) U.S. Cl.
CPC ......... *G06Q 10/1053* (2013.01); *G06F 40/20* (2020.01); *G06F 40/30* (2020.01); *G06N 5/022* (2013.01); *G06N 20/00* (2019.01)

(58) Field of Classification Search
None
See application file for complete search history.

(56) References Cited

U.S. PATENT DOCUMENTS

| 10,460,028 | B1 | 10/2019 | Flann |
| 10,699,227 | B2 | 6/2020 | Johnston |
| 11,030,404 | B1* | 6/2021 | Garg ................. G06F 40/289 |
| 2006/0229899 | A1* | 10/2006 | Hyder ................. G06Q 10/10 705/321 |
| 2009/0012842 | A1 | 1/2009 | Srinivasan |
| 2012/0197631 | A1 | 8/2012 | Ramani |

(Continued)

OTHER PUBLICATIONS

Singh,Taranjeet, "Natural Language Processing With spaCy in Python", 2021 Real Python, 21pgs.

(Continued)

*Primary Examiner* — Andrew B Whitaker
(74) *Attorney, Agent, or Firm* — Hickman Becker Bingham Ledesma LLP

(57) ABSTRACT

Techniques are described for automatically generating job descriptions. Job categories are identified for the documents in the job description dataset based on clustering the documents. Sections within each document in the job description dataset are automatically identified, and each identified section is automatically classified. Each type of section is analyzed independently of the other section types using natural language processing, which allows automatic generation of each section of a new job description based on the section-specific data derived from the dataset. Section- and category-specific selective phrases are identified within the job description dataset, and embeddings are generated for the identified selective phrases. A request to generate a new job description for a particular category is received. For each section of new job description, the selective phrase embeddings for the section and for the identified category are used to identify phrases to include within the section of the job description.

20 Claims, 10 Drawing Sheets

(56) References Cited

U.S. PATENT DOCUMENTS

| | | |
|---|---|---|
| 2014/0040275 A1 | 2/2014 | Dang |
| 2015/0066477 A1 | 3/2015 | Hu |
| 2015/0310392 A1* | 10/2015 | Wu .................. G06Q 10/1053 705/321 |
| 2016/0125361 A1* | 5/2016 | Vivas ................ G06Q 10/1053 705/319 |
| 2016/0163311 A1 | 6/2016 | Crook |
| 2016/0292149 A1 | 10/2016 | Mote |
| 2017/0357625 A1 | 12/2017 | Carpenter |
| 2018/0181915 A1* | 6/2018 | Chen ................ G06Q 10/1053 |
| 2018/0260474 A1 | 9/2018 | Surdeanu |
| 2018/0357608 A1* | 12/2018 | Agrawal .............. H04L 67/306 |
| 2019/0057310 A1 | 2/2019 | Olmstead |
| 2019/0114593 A1* | 4/2019 | Champaneria ...... G06F 16/3325 |
| 2020/0175109 A1* | 6/2020 | Gee ...................... G06F 40/279 |
| 2020/0193206 A1 | 6/2020 | Turkelson |
| 2020/0320483 A1* | 10/2020 | Bayireddi .......... G06Q 10/1053 |
| 2020/0380407 A1* | 12/2020 | Jiang ...................... G06N 20/10 |
| 2021/0004589 A1 | 1/2021 | Turkelson |
| 2021/0150484 A1* | 5/2021 | Mayerle ................... G06N 5/04 |
| 2021/0248324 A1* | 8/2021 | Choudhary .............. G06N 5/04 |

OTHER PUBLICATIONS

Rossiello, G., et al., "Centroid-based Text Summarization through Compositionality of Word Embeddings", Proceedings of the MultiLing 2017 workshop on Summrztn & SEAST&G, pp. 12-21, Apr. 3, 2017, 10pgs.

Paass, Gerhard, et al., "Machine Learning for Document Structure Recognition", Studies in Comput. Intell. publ. Jan. 2011, Jun. 22, 2009, 22pgs.

BinMakhashen, Galal. M., et al., "Document Layout Analysis: A Comprehensive Survey", ACM Comp. surveys, vol. 52, No. 6, Oct. 2019, 36pgs.

"Linguistic Features", spaCy Usage Documentation printed Mar. 15, 2021, https://spacy.io/usage/linguistic-features/, 37pgs.

Hinton, U.S. Appl. No. 17/241,069, filed Apr. 27, 2021, Notice of Allowance, dated Jul. 21, 2021.

Hinton, U.S. Appl. No. 17/241,069, filed Apr. 27, 2021, Notice of Allowance and Fees Due, dated Sep. 20, 2021.

\* cited by examiner

302 PERFORM SYNTACTIC PARSING, ON A PLURALITY OF JOB DESCRIPTIONS COMPRISING NATURAL LANGUAGE TEXT DATA, TO IDENTIFY, WITHIN THE PLURALITY OF JOB DESCRIPTIONS, A PLURALITY OF PHRASES THAT COMPRISES ONE OR MORE OF: VERB PHRASES, ADJECTIVE PHRASES, OR NOUN PHRASES

304 FOR EACH SECTION TYPE OF A PLURALITY OF JOB DESCRIPTION SECTION TYPES, IDENTIFY A SECTION-SPECIFIC PLURALITY OF SELECTIVE PHRASES FROM THE PLURALITY OF PHRASES, WHEREIN THE PLURALITY OF SELECTIVE PHRASES COMPRISES, FOR EACH JOB CATEGORY OF A PLURALITY OF JOB CATEGORIES, A SET OF JOB CATEGORY-SPECIFIC SELECTIVE PHRASES

306 RECEIVE A REQUEST TO GENERATE A JOB DESCRIPTION; DETERMINE, BASED ON THE REQUEST, THAT THE REQUEST TO GENERATE A JOB DESCRIPTION IS ASSOCIATED WITH A PARTICULAR JOB CATEGORY OF THE PLURALITY OF JOB CATEGORIES

308 FOR EACH SECTION TYPE OF THE PLURALITY OF JOB DESCRIPTION SECTION TYPES, GENERATE A CORRESPONDING SECTION IN A GENERATED JOB DESCRIPTION BY INCLUDING, IN THE CORRESPONDING SECTION, ONE OR MORE PHRASES FROM A PARTICULAR SET OF SELECTIVE PHRASES, SPECIFIC TO THE PARTICULAR JOB CATEGORY, FROM THE SECTION-SPECIFIC PLURALITY OF SELECTIVE PHRASES FOR SAID EACH SECTION TYPE

310 RETURN THE GENERATED JOB DESCRIPTION AS A RESPONSE TO THE REQUEST

FIG. 4  400

Registered Nurse —402

Reporting relationship —404A
- Nurse Unit Manager
- Clinical Nurse Manager

...

Job purpose / summary —404B
This role is center-based and requires ...

Duties and responsibilities —404C
The ideal candidate will be responsible for:
- Providing direct patient care activities including assessment, diagnosis, planning, implementation, and evaluation within the guidelines of the standards of nursing care to critical patients who require a high level of clinical expertise.
- Conducting Comprehensive NURSING ASSESSMENTS that include: medical history, drug history, physical, social, psychological healthdetox scoring, and implementing detoxification plans under the supervision of head nurse and other medical support staff that ensures the safety and well being of the patient.

...

Competencies —404D
The ideal candidate will demonstrate competencies in the following areas:
- Patient Education
- Time Management

...

Tools and Technologies —404E
- Microsoft Office
- Microsoft Word

...

Qualifications —404F
Education. Most candidates for this position are expected to have the following credentials: bachelors degree in one of the following areas: Nursing, or public health. —406A
Experience. On average, candidates are expected to have 2 years of on-the-job experience. —406B

FIG. 6A

"ideal candidate"

| | Nursing | Architecture | Software developer |
|---|---|---|---|
| Competencies | 0 | 0 | 0 |
| Tools and Technologies | 0 | 0 | 0 |
| Duties and Responsibilities | 8,500 | 9,400 | 7,200 |

"CAD"

| | Nursing | Architecture | Software developer |
|---|---|---|---|
| Competencies | 0 | 9,800 | 0 |
| Tools and Technologies | 0 | 0 | 0 |
| Duties and Responsibilities | 0 | 7,500 | 0 |

FIG. 6B

"patient charts"

|  | Nursing | Architecture | Software developer |
|---|---|---|---|
| Competencies | 1,400 | 0 | 0 |
| Tools and Technologies | 0 | 0 | 0 |
| Duties and Responsibilities | 9,570 | 0 | 0 |

"C++"

|  | Nursing | Architecture | Software developer |
|---|---|---|---|
| Competencies | 0 | 100 | 7,500 |
| Tools and Technologies | 0 | 0 | 0 |
| Duties and Responsibilities | 0 | 70 | 6,400 |

FIG. 6C

"Microsoft Word"

| | Nursing | Architecture | Software developer |
|---|---|---|---|
| Competencies | 0 | 0 | 0 |
| Tools and Technologies | 9,600 | 8,500 | 6,500 |
| Duties and Responsibilities | 500 | 700 | 200 |

JOB DESCRIPTION GENERATION BASED ON MACHINE LEARNING

RELATED APPLICATION

This application is related to U.S. application Ser. No. 17/241,069, titled "Generating Skill Data Through Machine Learning", and filed Apr. 27, 2021, the entire contents of which are hereby incorporated by reference as if fully set forth herein. (This application is referred to herein as the "Skill Data Application".)

FIELD OF THE INVENTION

Techniques described herein relate to machine learning-based generation of content, and, more specifically, to using machine learning and statistical analysis of a dataset of job-related data to automatically generate job description content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

A good job description used to advertise an open position attracts applicants that are well-qualified to perform tasks associated with the position. Conventionally, job descriptions are written manually, which often results in a lack of focus, accuracy, or comprehensiveness. For example, in describing an open position and finding good candidates for the position, it is helpful to recognize an adequate set of skills that is required by the position. However, some skill names may be left out of a job description because they are unfamiliar to the writer or because the significance of the corresponding skills is not realized by the writer. Furthermore, skill meanings can also be obscured in a hand-written job description. For example, the job description writer may describe a set of tasks that require skill A, but mistakenly label the required skill as skill B in the job description, e.g., due to the fact that the writer is not an expert in skills ontologies/taxonomies/labor markets. Failure to include all pertinent skill names in a job description reduces the chances of finding the most qualified candidates.

Starting with a job description template or a prior job description would not remedy some of the deficiencies noted above in connection with a manual effort. Most automatic text generation systems are intent-driven and predict short segments of text that is expected to occur next. Such systems are not suitable for automatically generating complete job descriptions. Specifically, automatic text generation systems may generate short natural language text that is indistinguishable from human-created text, but automatic generation of longer text passages (as would be required to generate a job description) generally results in text that includes repetitions and nonsense that should not be included in a job description. Furthermore, it can be difficult for automatic text generation systems to learn the level of formatting (such as patterns of bulleted lists, partial sentences, full sentences, etc.) that is generally found within a job description.

Thus, it would be beneficial to automatically generate a full job description that is tailored to a particular open position, and that automatically includes a range of skill names and other data that are pertinent to the type of position being described.

BRIEF DESCRIPTION OF THE DRAWINGS

In the drawings:

FIG. 3 illustrates a process of automatically generating a requested job description based on a dataset of job descriptions.

FIG. 4 depicts an example job description.

FIG. 6A depicts section- and job category-specific counts for example phrases.

FIG. 6B depicts section- and job category-specific counts for example phrases.

FIG. 6C depicts section- and job category-specific counts for example phrases.

DETAILED DESCRIPTION

Figure 1:
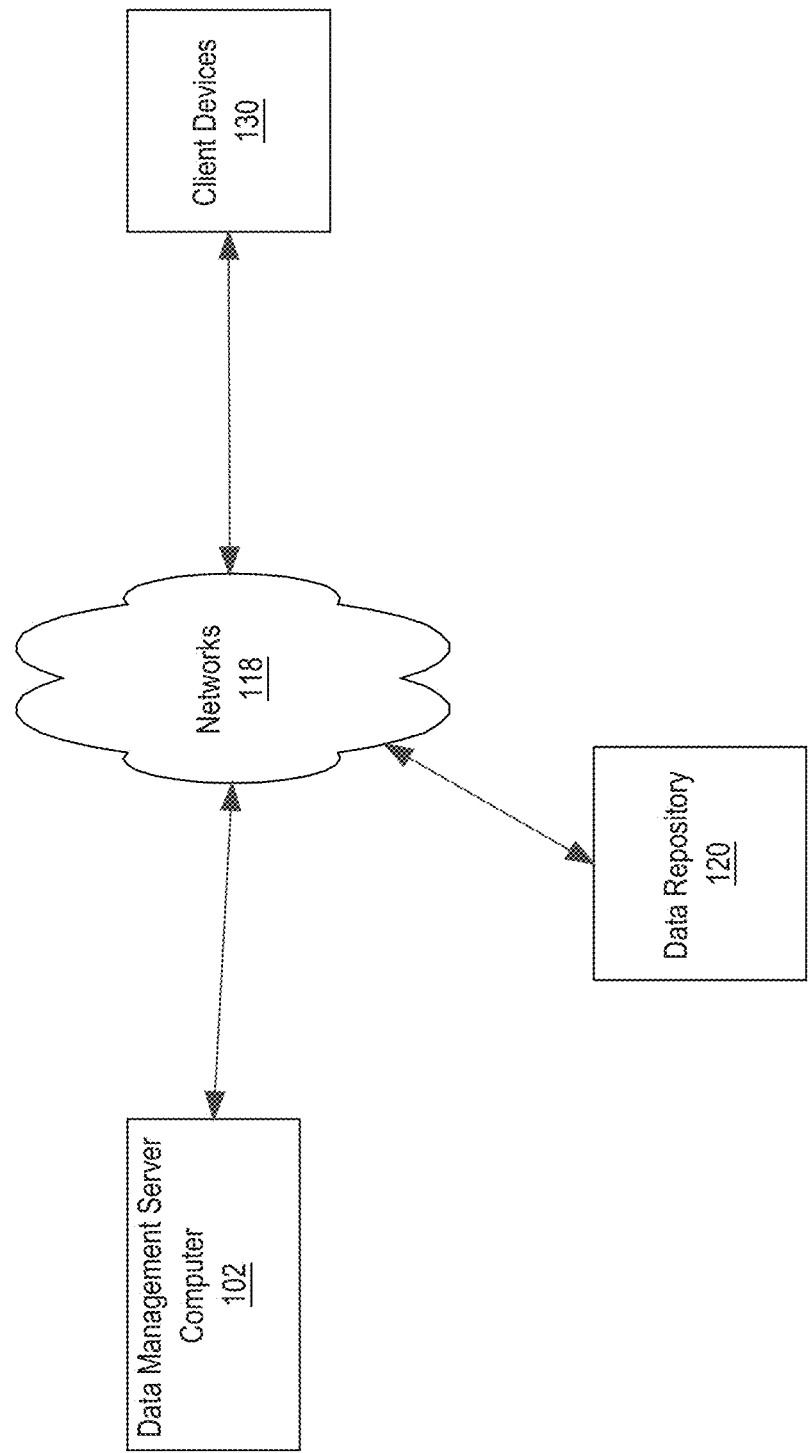
FIG. 1 illustrates an example networked computer system in which various embodiments may be practiced.

In the following description, for the purposes of explanation, numerous specific details are set forth in order to provide a thorough understanding of the techniques described herein. It will be apparent, however, that the techniques described herein may be practiced without these specific details. In other data samples, well-known structures and devices are shown in block diagram form in order to avoid unnecessarily obscuring the techniques described herein.

1. General Overview

Techniques are described herein for automatically generating job descriptions using a corpus-based approach, e.g., based on a job description dataset. Specifically, job categories are identified for the documents in the job description dataset. Furthermore, the job description documents in the job description dataset are analyzed using both syntactic natural language parsing and semantic natural language parsing.

According to an embodiment, section-specific natural language parsing is performed on the job description documents. Specifically, sections within each document in the job description dataset are automatically identified. Each identified section, within each job description, is automatically classified as being associated with a known section type of a list of known section types. The list of known section types may be provided by an administrator, identified using machine learning (ML), or identified using active machine learning, which utilizes input from an administrator. Each type of section can be analyzed independently of the other section types, which allows automatic generation of each section of a new job description based on the section-specific data derived from the job description dataset.

To generate the section-specific data, based on the results of the natural language parsing performed on the documents of the job description dataset, section-specific and job category-specific selective phrases (which are nouns, adjectives, and verbs from the job description dataset that are selective for the various job categories within sections of each section type) are identified. According to an embodiment, selective phrases for a given job category are phrases that have high selectivity for the job category, i.e., phrases that are commonly found within job descriptions associated with the job category and are not commonly found within job descriptions associated with other categories.

When a request to generate a new job description is received, the selective phrases are used to generate the new job description. Specifically, a job category is identified for the requested job description. Then, for each section type to be included in the new job description, the selective phrases for the section and for the identified job category are used to identify phrases to include within the section of the job description.

Using techniques described herein, job descriptions may be automatically generated more efficiently than when generated by a human, even when the human starts from a template or previously-written job description. Thus, fewer computing resources are required to generate the job description using the described techniques. Furthermore, the job descriptions are generated using skill name databases, which results in job descriptions that accurately and thoroughly describe skills that are associated with the described job. The resulting job descriptions accurately and effectively communicate job requirements, which improves communication using the job descriptions.

2. Example Computing Environment

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a data management server computer 102 ("server"), a data repository 120, and one or more client devices 130, which are communicatively coupled directly or indirectly via one or more networks 118.

In some embodiments, server 102 broadly represents one or more computers, virtual computing instances, and/or instances of a server-based application that is programmed or configured with data structures and/or database records that are arranged to host or execute functions including but not limited to collecting skill data, managing knowledge graphs, and generating job descriptions for specified positions or job openings. The server 102 can comprise a server farm, a cloud computing platform, a parallel computer, or any other computing facility with sufficient computing power in data processing, data storage, and network communication for the above-described functions.

In some embodiments, each of the one or more client devices 130 is programmed to submit requests, which can be related to skills, and process the replies to the requests. Each of the one or more client devices 130 can be programmed to also receive or transmit relevant data, such as resumes or job postings. Each of the one or more client devices 130 may comprise a desktop computer, laptop computer, tablet computer, smartphone, wearable device, or any other type of computing device with sufficient computing power in data processing, data storage, and network communication for the above-described functions.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

3. Example Computer Components

Figure 2:
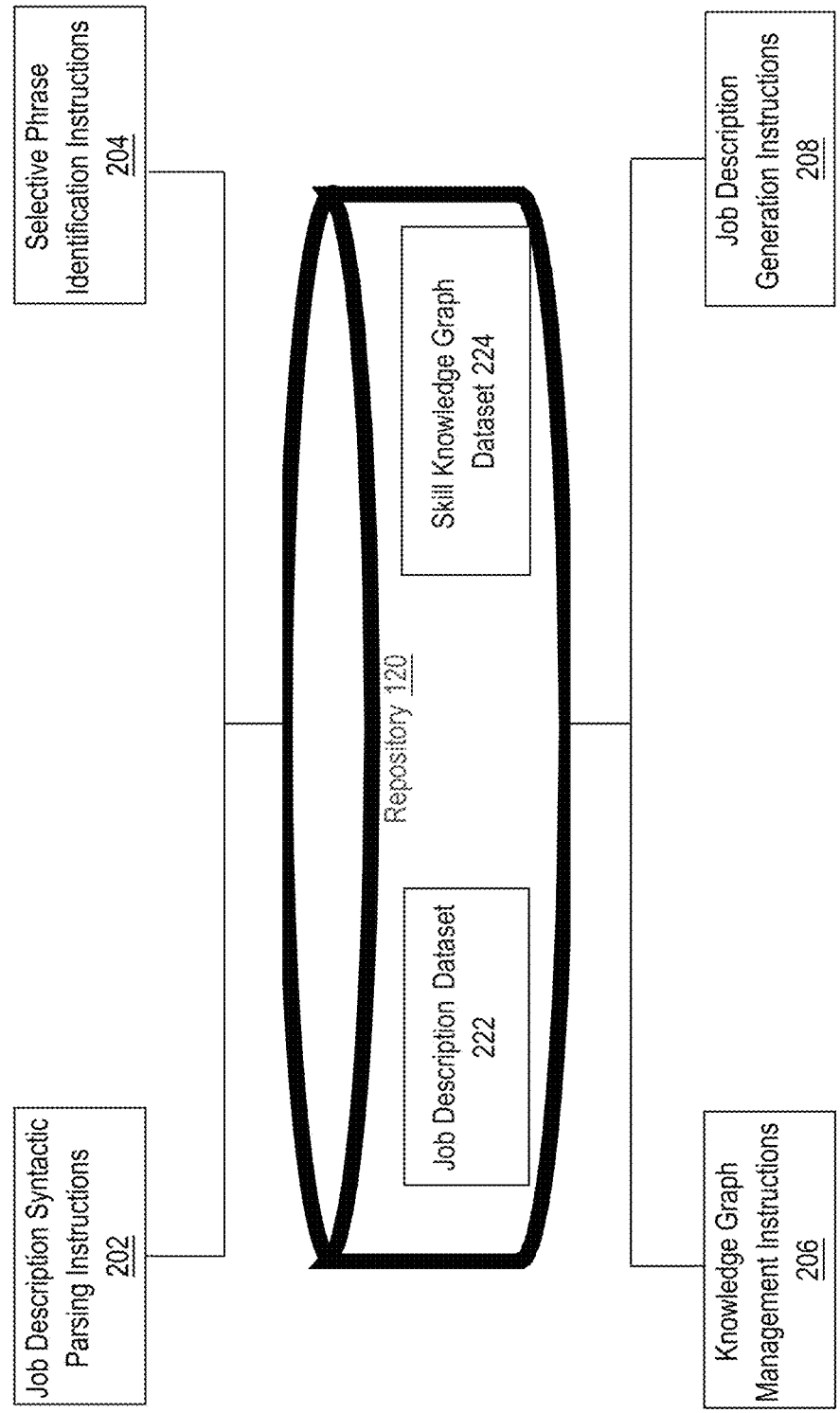
FIG. 2 illustrates example components of a data management server computer in accordance with the disclosed embodiments.

FIG. 2 illustrates example components of server 102 in accordance with the disclosed embodiments. This figure is for illustration purposes only and server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, as described in further detail below, server 102 can comprise job description syntactic parsing instructions 202, selective phrase identification instructions 204, knowledge graph management instructions 206, and job description generation instructions 208.

As indicated above, server 102 can comprise a repository 120. In some embodiments, the repository 120 is programmed or configured to manage relevant data structures and store relevant data for functions performed by server 102. In the example embodiment of FIG. 2, repository 120 comprises a job description dataset 222 and a skill knowledge graph dataset 224.

4. Functional Description

Server 120 is configured to automatically generate job descriptions using a corpus-based approach, e.g., based on job description dataset 222. Server 102 can identify job categories for the documents in job description dataset 222 based on clustering the documents. Furthermore, server 102 analyzes the job description documents in job description dataset 222 using both syntactic natural language parsing and semantic natural language parsing.

According to an embodiment, server 102 performs section-specific natural language parsing on the job description documents. Specifically, server 102 automatically identifies sections within each document in job description dataset 222. Server 102 classifies each identified section, within each job description, as being associated with a known section type of a list of known section types. The list of known section types may be provided by an administrator, identified using machine learning, or identified using active machine learning, which utilizes input from an administrator. Each type of section is analyzed independently of the other section types, which allows server 102 to automatically generate each section of a new job description based on the section-specific data derived from job description dataset 222.

To generate the section-specific data, based on the results of the natural language parsing performed on the documents of job description dataset 222, server 102 identifies section-specific and job category-specific selective phrases, which are nouns, adjectives, and verbs from job description dataset 222 that are selective for the various job categories within sections of each section type. According to an embodiment, selective phrases for a given job category are phrases that have high selectivity for the job category, i.e., phrases that are commonly found within job descriptions associated with the job category and are not commonly found within job descriptions associated with other categories. Embeddings in the context of machine learning can be generated for these selective phrases.

When a request to generate a new job description is received, server 102 uses the selective phrase embeddings to generate the new job description. Specifically, server 102 identifies a job category for the requested job description. Then, for each section type to be included in the new job description, server 102 uses the selective phrase embeddings for the section and for the identified job category to identify phrases to include within the section of the job description.

4.1. Job Categories

According to an embodiment, each job description document in job description dataset 222 is associated with a job category of a plurality of job categories. The job description documents may be assigned a job category by an administrator, or categories may be automatically determined by server 102.

According to an embodiment, to automatically identify categories for job descriptions in dataset 222, server 102 clusters the job descriptions documents based on information in the documents. For example, server 102 generates embeddings of the titles of the job description documents, or generates embeddings of words within the titles of the job description documents, and identifies clusters of job descriptions based on the embeddings. As another example, server 102 uses natural language processing (described in further detail below) to identify entities (such as nouns and verbs) within the job descriptions and clusters the job descriptions based on embeddings of the identified entities.

Each cluster of job descriptions represents a particular job category, which, according to an embodiment, is labeled by a system administrator. The job descriptions within each given cluster are automatically associated with the job category of the cluster. For example, a job description title "Software Engineer Manager" is most closely semantically related to other job description titles associated with the job category "Manager", and as such, the job description is associated with the job category "Manager".

As another example, the job description titled "Software Engineer Manager" comprises the nouns "software" (which is most closely semantically related to other words associated with the job category "Software Developer"), "engineer" (which is most closely semantically related to other words associated with the job category "Engineering"), and "manager" (which is most closely semantically related to other words associated with the job category "Manager"). As such, the job description is automatically associated with the job categories "Software Developer", "Engineering", and "Manager".

Job categories may be as specific as a job title or as general as a professional field. For example, each job description in the dataset is associated with one or more job categories, which may be metadata of the job description documents, or may be included in the job descriptions (e.g., the title of the job description, a "field" of the job description, industry associated with the job description, one or more keywords that are automatically identified within the job description), etc. As another example, machine learning techniques, including some statistical techniques, are used to automatically identify one or more pertinent job categories for each job description.

The job categories associated with a given job description may be arranged hierarchically or may be otherwise related. For example, a particular job description with the title "Sr. Software Engineering Manager" is associated with the high-level job category of "Software Technology", with the high-level job category of "Management roles", and with a cross-over or composite job category of "Software Manager", which is a sub-category of both of the high-level job categories. As another example, a particular job description with the title "Neonatal Nurse Practitioner" is associated with the high-level job category of "Nursing", and with two sub-categories of "Nursing": "Neonatal Nurse", and "Nurse Practitioner".

For example, server 102 automatically identifies a configurable number of job categories for descriptions in job description dataset 222. If there are few job descriptions in job description dataset 222 in the field of nursing compared to other fields in the dataset, then server 102 may identify only the field of "nursing" with associated job titles without any intervening specialties. As another example, in such circumstances, server 102 may identify only the field of "nursing". Further, if there are many job descriptions in the dataset in the field of nursing compared to other fields in the dataset, server 102 may identify multiple specialties into which the job titles are further categorized, such as "neonatal", "hospital", etc.

4.2. Job Description Sections

Job description documents, in job description dataset 222, include various sections with particular content requirements. To illustrate sections of a job description, FIG. 4 depicts an example job description 400 that includes a title 402, and section headers/types 404A-F. According to an embodiment, title 402 is considered a section of the job description.

For example, in section 404A, titled "Reporting relationship", job description 400 lists job titles of people to whom a person fulfilling the described position would report. As another example, in section 404B, titled "Job purpose/summary", job description 400 includes a summary of the role that person fulfilling the described position would fulfill.

A particular section of a job description may include sub-sections. For example, section 404F, titled "Qualifications", includes two subsections 406A and 406B, respectively titled "Education" and "Experience". Each of these subsections, while related, include different content. Specifically, in this case, "Education" subsection 406A lists education-based qualifications, i.e., degrees that would be expected for a person fulfilling the described position. The "Experience" subsection 406B includes experience-based qualifications, i.e., a number of years of experience performing similar jobs.

Job description sections used herein are not limited to those included in example job description 400. For example, any number of additional sections (such as "Certifications/License requirements", and/or "Clearance Levels") may be included with one or more sections in example job description 400 in a list of sections used to generate a job description. Furthermore, one or more sections used, according to embodiments herein, may be substantively the same as sections in job description 400 but with different labels, or may have different formats than the formats illustrated in FIG. 4.

According to an embodiment, server 102 maintains information indicating a plurality of section types that is used for all job categories. According to yet another embodiment, server 102 maintains information indicating a job category-specific plurality of sections for one or more of the job categories. Embodiments are described herein in the context of server 102 maintaining information indicating a list of sections for all job categories. However, embodiments are not limited thereto.

4.2.1 Automatically Identifying Job Description Sections

According to another embodiment, server 102 automatically identifies various logical sections within each document of job description dataset 222. The logical sections of a job description document are the chunks of text data separated by headers/labels, such as title 402 and headers 404A-F of FIG. 4, each of which occurs at the beginning of a respective logical section of the document.

For example, document layout analysis (DLA) may be performed to identify logical sections within the job description documents in job description dataset 222. (More information regarding DLA may be found in Galal M. Bin-Makhashen and Sabri A. Mahmoud. 2019. Document Layout Analysis: A Comprehensive Survey. ACM Comput. Surv. 52, 6, Article 109 (October 2019), which is incorporated by reference as if fully set forth herein.) As another example, machine learning may be used to recognize the structure of job description documents, as described in Paass, Gerhard & Konya, Iuliu. (2011). Machine Learning for Document Structure Recognition. Studies in Computational Intelligence. 370. 10.1007/978-3-642-22613-7_12, which is incorporated by reference as if fully set forth herein.

4.2.2 Automatically Identifying Job Description Section Types within the Job Description Dataset According to an embodiment, server 102 uses machine learning to identify a list of known job description section types that occur within documents of dataset 222. Specifically, server 102 trains an ML model over a set of labeled job description documents that are labeled to identify the types of logical sections in the documents. Thereafter, server 102 uses the trained ML model to identify the types of sections in each job description document in job description dataset 222.

Furthermore, according to an embodiment, server 102 uses active learning to identify previously-unseen section types within job description dataset 222. For example, server 102 uses the trained ML model to identify logical sections, within documents of job description dataset 222, that have more than a threshold likelihood of being associated with a section type that is previously unseen. Server 102 requests a user to review the "new" section(s) identified using the ML model. Upon receiving an indication that one or more of the identified sections are of a particular previously-unknown section type, the identified section type is added to the list of known section types.

According to an embodiment, one or more job categories are associated with a job category-specific list of section types. In this embodiment, when a new section type is identified within job description dataset 222, server 102 determines whether the documents that include the new section type satisfies job category association criteria (e.g., over a threshold percentage of documents of the job category include the new section type, etc.). In response to determining that the new section type satisfies the job category association criteria, the new section type is included in a job category-specific list of sections for the identified job category.

4.3 Syntactic Natural Language Processing of Job Descriptions

FIG. 3 includes a flowchart 300 that illustrates a process of automatically generating a requested job description based on a dataset including job descriptions, such as job description dataset 222 of repository 120. The steps of flowchart 300 may be performed in any order, according to embodiments.

At step 302 of flowchart 300, syntactic parsing is performed, on a plurality of job descriptions comprising text data, to identify, within the plurality of job descriptions, a plurality of phrases that comprises one or more of: verb phrases, adjective phrases, or noun phrases. For example, based on job description syntactic parsing instructions 202 in FIG. 2, server 102 performs natural language processing (NLP) to identify a plurality of phrases (including, according to an embodiment, one or more verb phrases, one or more adjective phrases, and one or more noun phrases also referred to as "entities") from the job descriptions of job description dataset 222.

Natural language processing includes applying techniques, such as segmentation, tokenization, and co-reference resolution, to language text data. Such techniques convert language text into a tokenized structured format that can be more effectively consumed by a machine learning model. According to an embodiment, server 102 identifies a plurality of phrases, including noun phrases, adjective phrases, and verb phrases, within the job descriptions of job description dataset 222 based on one or more of the following natural language processing steps: sentence segmentation, tokenization, part of speech tagging, lemmatization, stop words identification, dependency parsing, noun phrase identification, adjective phrase identification, verb phrase identification, named entity recognition, and co-reference resolution.

A non-limiting example natural language parser is the Berkely neural constituency parser (benepar), which is used to detect noun phrases recursively. Frequently, noun phrases consist of smaller (embedded) noun phrases inside of them; the constituency parser may be used to extract noun phrases at different levels of syntactic recursion. As another non-limiting example, spaCy's dependency parser may further be used to identify transitive verbs in order to combine them with dependent noun phrases.

The output of constituency and dependency parsers is a set of syntactic n-grams, which, according to an embodiment, form a skilled candidate pool. Each n-gram in the candidate pool is evaluated for similarity to each skill in a skills index, e.g., in knowledge graph dataset 224. This evaluation may be done by vectorizing skills in the index and candidate pool, e.g., using a word2vec model. Furthermore, a k-nearest neighbor search is performed against the skills index with a predetermined cosine similarity threshold. For each skilled candidate, a pre-determined number (e.g., 100) of nearest neighbors are retrieved from the vector index; only those that meet the similarity threshold are considered as semantic matches.

4.4 Semantic Natural Language Processing of Job Descriptions

According to an embodiment, server 102 also performs semantic parsing on the job description documents of job description dataset 222 to produce formal representations of the meanings of sentences in the documents. After the syntactic processing yields different types of phrases, server 102 can perform semantic processing to determine which of those phrases are likely to correspond to information actually related to a job using any semantic processing technique known to someone skilled in the art, such as first order predicate logic, semantic nets, etc. For example, it can be recognized that "certified public accountant" as one or more syntactically determined phrases actually corresponds to one of the skill categories, as further discussed below. Therefore, this phrase could be used to determine a bigger set of selective phrases in a job description, as also further discussed below. Using the resulting semantic information, server 102 identifies semantic connections between entities identified within job description dataset 222. For example, using semantic information, server 102 identifies skill names, within each given job description associated with one or more job categories, that are required for the described job. Server 102 encodes this information that relates skill names to job categories, e.g., in skill knowledge graphs.

Specifically, server 102 maintains one or more skill knowledge graphs, e.g., in skill knowledge graph dataset 224 in repository 120. A skill knowledge graph includes skill nodes that represent skill names and/or words of skill names, and edges that represent syntactic or semantic relationships between the skill nodes. Thus, the structure of a skill knowledge graph reflects the syntactic and/or semantic relationships among the represented skills. (For additional information regarding skill knowledge graphs, see the Skill Data Application incorporated by reference above.)

Figure 5A:
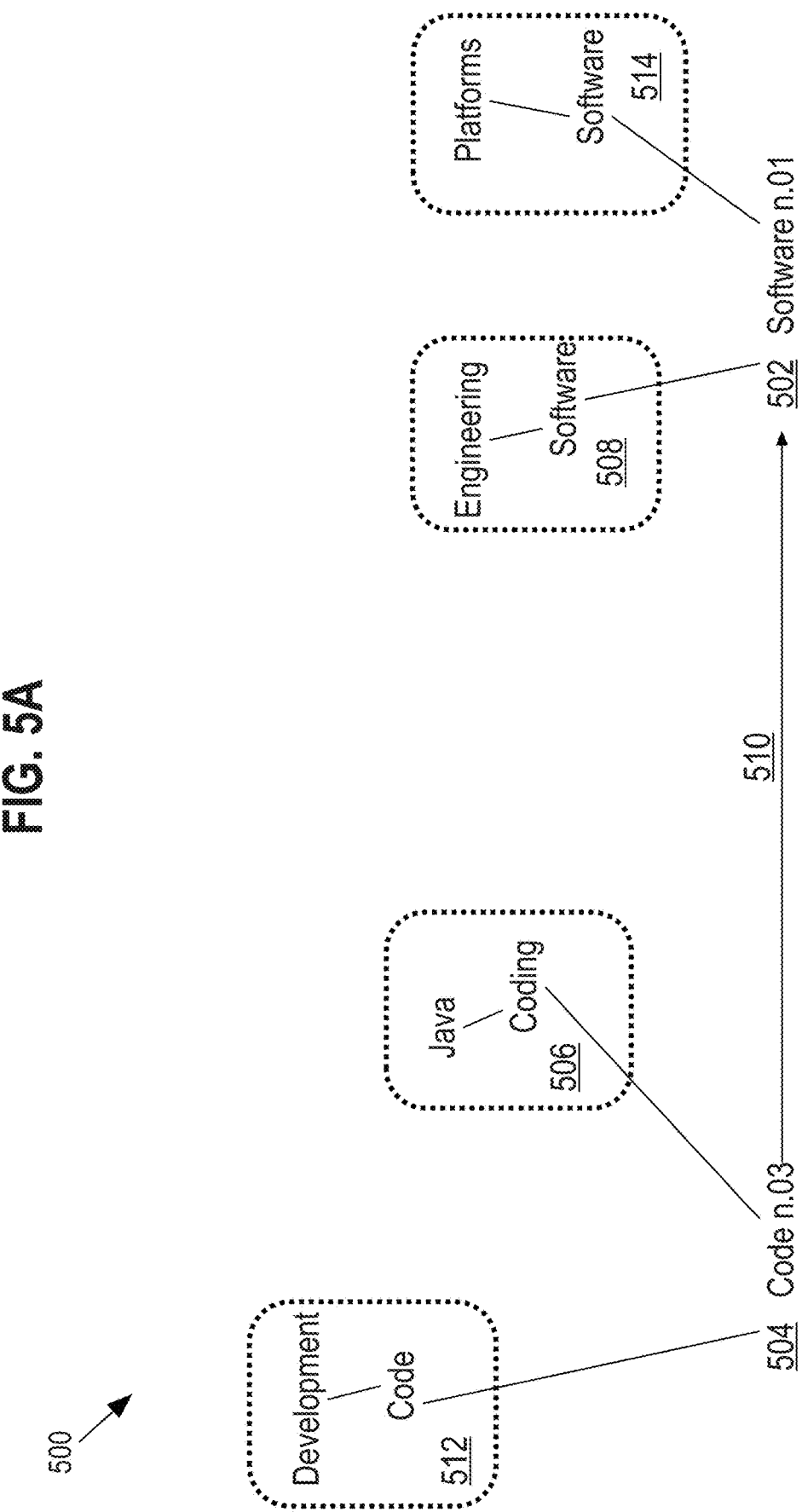
FIG. 5A illustrates an example skill knowledge graph.

To illustrate, FIG. 5A depicts an example skill knowledge graph 500 in skill knowledge graph dataset 224. According to an embodiment, server 102 maintains knowledge graph 500 based on knowledge graph management instructions 206 in FIG. 2. Knowledge graph 500 comprises a plurality of nodes that includes two example sub-graphs corresponding to the following synset nodes that represent words in hypernym trees: a node 502 representing "software" n.01, and a node 504 representing "code" n.03. Skill knowledge graph 500 further comprises synset word meaning indicators, such as "n.03" associated with the word "Code" in node 504. This example synset word meaning indicator indicates that "code" is a noun with a meaning corresponding to the "03" identifier within a list of known meanings of the term as a noun.

Dependency graphs 506, 508, 512, and 514 in knowledge graph 500 comprise multiple skill name token nodes that are associated with the meaning of the corresponding synset node. For example, the dependency graph 506 for the skill name "Java coding" has a syntactic root "coding". The corresponding word "code" is identified from the hypernym tree, and the skill name "Java coding" is determined to be closest in meaning to "code" n.03 in the hypernym tree. Therefore, dependency graph 506 is connected to the synset node 504 representing "code" n.03 in the knowledge graph. Similarly, dependency graph 508 for the skill name "software development" has a syntactic root "software". The meaning of "software" corresponding to "software" n.01 is assigned to the skill name "software development". Therefore, the dependency graph 508 is connected to the synset node 502 representing "software" n.01 in the knowledge graph.

According to an embodiment described above, using relationships identified based on semantic information for the job description documents, server 102 records job category information in skill knowledge graph dataset 224 such that one or more skill names represented within dataset 224 are associated with one or more respective job categories, as identified using the semantic information. When server 102 identifies a node in skill knowledge graph dataset 224 that corresponds to a particular phrase from a job description, server 102 associates the node with context information, including the one or more job categories associated with the job description. According to an embodiment, server 102 also associates the identified node with one or more other nodes of phrases occurring within the job description. According to an embodiment, if no node in skill knowledge graph dataset 224 corresponds to a particular phrase from a job description, then server 102 creates a node for the phrase within dataset 224 and then associates the new node with context information as described above.

Figure 5B:
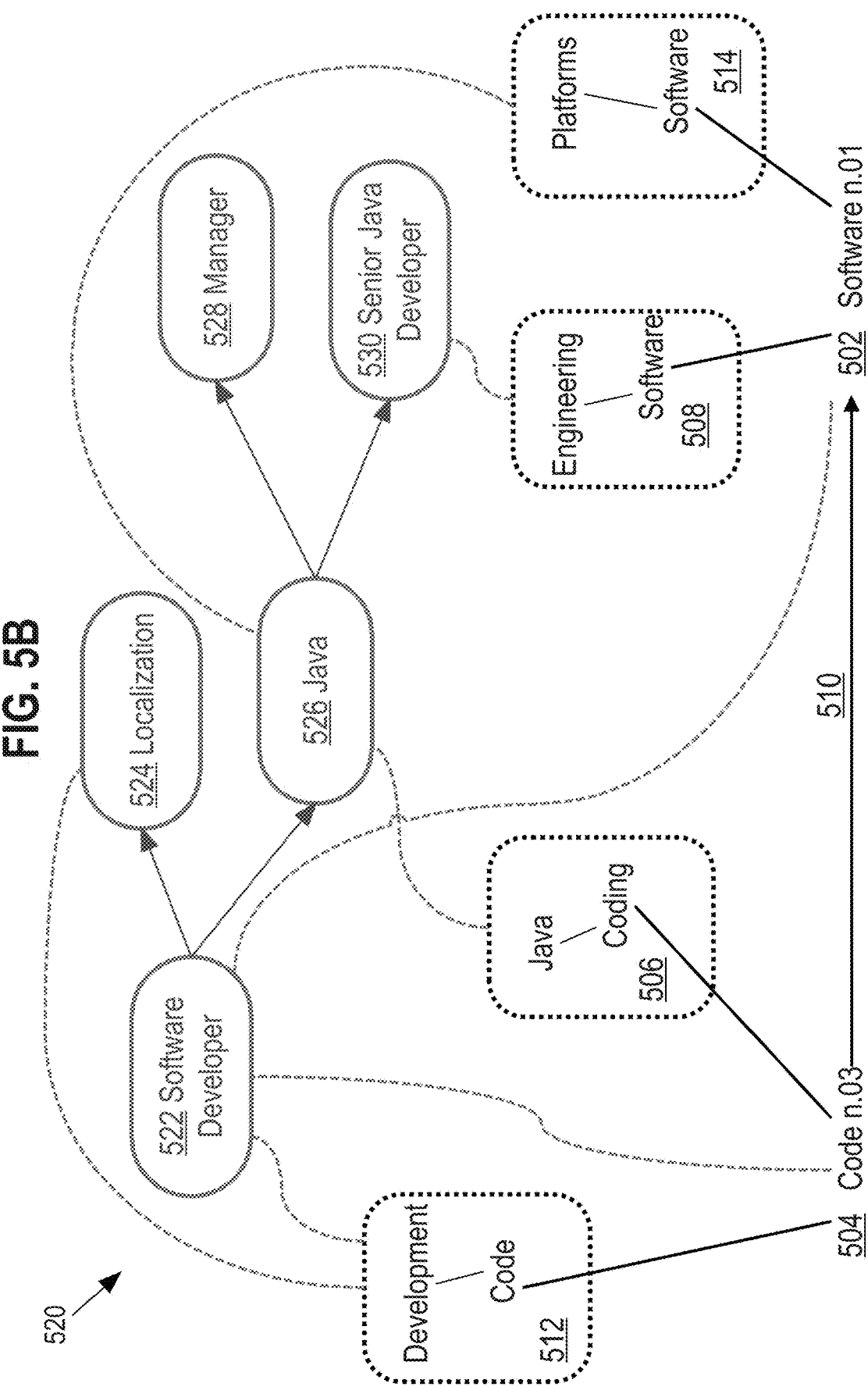
FIG. 5B illustrates another example skill knowledge graph.

FIG. 5B depicts an example skill knowledge graph 520 that includes both the nodes of example skill knowledge graph 500 in FIG. 5A and a plurality of job category nodes 522-530. In example graph 520, job category nodes 522-530 are organized as a hierarchy where parent nodes represent general job categories such as professional fields (e.g., "software developer" node 522) and child nodes represent more specific job categories such as specialties within a professional field (e.g., "localization" node 524 and "Java" node 526), and/or job titles within a professional field or field specialty (e.g., "Manager" node 528 and "Senior Java Developer" node 530).

According to an embodiment, using the semantic information derived from job description dataset 222, server 102 further identifies organization names within the job descriptions. Server 102 associates, in skill knowledge graph dataset 224, skill names found within a given job description with an organization also found within the job description. Thus, the skill names that co-occur with organization names within job descriptions are semantically related within skill knowledge graph dataset 224.

4.5 Identifying Section-Specific Selective Phrases for Job Categories

A job description typically corresponds to a job title that falls in a job category, as further discussed below. As a simple example, the job title could be "Java programmer", and the job category could be "technology development". At step 304, for each section type of a plurality of job description section types, a section-specific plurality of selective phrases is identified from the plurality of phrases, where the plurality of selective phrases comprises, for each job category of a plurality of job categories, a set of job category-specific selective phrase. As used herein, the term "section-specific" refers to information that is specific to a particular section type. According to an embodiment, selective phrases for a given job category are phrases that have high selectivity for the job category, i.e., phrases that are commonly found within job descriptions associated with the job category and are not commonly found within job descriptions associated with other categories. For example, server 102 uses skill knowledge graphs in skill knowledge graph dataset 224 and/or statistical analysis of the phrases identified within job description dataset 222 to identify selective phrases for the job description sections of each job category.

To illustrate, for each element of a given job description, a set of phrases is extracted based on a skills index, e.g., in skill knowledge graph dataset 224. A centroid vector is then calculated for all phrases within each section of a job posting, and phrases are ranked relative to that centroid. According to an embodiment, top ranking phrases are used to fill in the slots of the job description template. Any dense word embedding technique can be used for vectorizing the skills index, such as (attention-based transformers, word2vec, glove. According to an embodiment, the skip gram variant of the word2vec algorithm is used to generate text from identified phrases; under this unsupervised approach, embeddings are learned by predicting a context word relative to a target word, e.g., using a softmax function. According to an embodiment, vectors have 900 dimensions to capture as much useful information as possible without diminished return. According to an embodiment, the window size (radius for context words) is limited to 2 in order make the vectors more sensitive to local, semantic information.

4.5.1 Analysis Based on Skill Knowledge Graphs

According to an embodiment, at step 304 and based on selective phrase identification instructions 204 in FIG. 2, server 102 compares phrases identified within job description dataset 222 with skill knowledge graphs in skill knowledge graph dataset 224 to determine, for each section of a plurality of sections, a set of phrases, from the phrases identified for the section from job description dataset 222, that are selective for each job category of a plurality of job categories associated with the job descriptions in dataset 222. The set of phrases could include phrases that exist identified from existing job descriptions or additional skill names identified from the skill knowledge graphs.

4.5.1.1 Determining Selective Phrases Based on Skill Knowledge Graphs

For example, server 102 identifies selective phrases within a particular job description document, associated with one or more job categories, by identifying those phrases, within the job description document, that match skill names in skill knowledge graph dataset 224. According to an embodiment, server 102 identifies matches between phrases and skill names in skill knowledge graph dataset 224 based on one or more of: exact term matching, fuzzy matching, distances between term embeddings (as described in further detail below), etc. Furthermore, these search techniques may also be used in connection with synonyms, e.g., from a repository of synonyms, of one or both of skill names and one or more words in the selective phrases. Based on a match between a skill name represented in a particular skill knowledge graph and a given phrase within a job description document associated with a particular job category, server 102 includes, in the set of job category-specific selective phrases for the particular job category, the matching skill name.

According to an embodiment, server 102 further includes, in the set of job category-specific selective phrases for the particular job category, phrases derived from nodes within skill knowledge graph dataset 224 that are located within a threshold semantic distance (length of the path) of a node representing the skill name matching the selective phrase. As indicated above, each skill name in the skill knowledge graph could be associated with metadata, such as a list of skill categories or a list of associated job titles or job categories. The list of skill categories could be "technical skills", "human agents", such as a process server or a certified public accountant, "organizations", such as Association of Computing Machinery (ACM) membership, or "certifications", such as a certification offered by Cisco, "communication skills", "organization skills", and so on.

For example, a particular job description in dataset 222, associated with the job category "Software Developer", includes the phrase "Java code". The threshold distance for finding related skill names in this example is one, which can be considered to correspond to traversal of at most a single edge within a skill knowledge graph. Server 102 determines that the target phrase matches the skill name "Java coding" represented by the dependency graph 506 in skill knowledge graph 500. For example, server 102 uses exact or fuzzy matching to identify matches between phrases and skill names in skill knowledge graphs. Based on identifying a match, server 102 includes the phrase "Java code" in the set of selective phrases identified for the job category "Software Developer".

Furthermore, the distance between dependency graph node 506 for "Java coding" and dependency graph 512 for "code development" can be computed to be zero because both dependency graph 506 and dependency graph 512 are connected to synset node 504. As such, (assuming the term is not already included in the applicable selective phrase set) server 102 includes "code development" in the set of selective phrases identified for the job category "Software Developer". Furthermore, the distance between the dependency graph 506 for "Java coding" rooted at node 504 and the dependency graph 508 for "software engineering" rooted at node 502 can be computed to be one through edge 510 in graph 500. Because this is within the threshold distance, server 102 includes "software engineering" in the set of selective phrases identified for the job category "Software Developer", if this term is not already in the set. Similarly, the dependency graph 514 can be computed to be a distance of one from dependency graph 506, and, as such, server 102 includes "software platforms" in the set of selective phrases identified for the job category "Software Developer", if this term is not already in the set. While this example shows only skill names being added to the sets of selective phrases, any other kind of data in the skill knowledge graphs may be included in the sets of selective phrases based on phrase/node matching.

In addition to or in place of using a threshold distance, the traversal of the skill knowledge graph could also be limited by the skill categories noted above. For example, the skill names in a connected node could be included until the category of the skill name no longer applies to the current job description section.

4.5.1.2 Traversing the Skill Knowledge Graph to Identify Selective Phrases

According to an embodiment, server 102 traverses skill knowledge graphs in dataset 224, which include nodes representing job categories as depicted in FIG. 5B, to identify selective phrases for the various job categories. According to an embodiment, server 102 includes, in the selective phrases for a target job description section and a target job category, phrases that were identified within the target section of job description documents in dataset 222 that match nodes associated with the target job category in a skill knowledge graph. Additional job categories identified from the skill knowledge graph can be added as selective phrases subject to a threshold degree of separation from an initially matching job category in the skill knowledge graph.

4.5.2 Statistical Analysis of Job Description Text

According to an embodiment, at step 304, server 102 performs statistical analysis based on selective phrase identification instructions 204 in FIG. 2 to determine, for each section of a plurality of sections, a set of phrases, from the phrases identified for the section from job description dataset 222, that are selective for each job category of a plurality of job categories associated with the job descriptions in dataset 222.

According to an embodiment, for each section in the list of job description sections, server 102 calculates a plurality of job category-specific phrase counts as a starting point for identifying selective phrases. Specifically, for each phrase of the plurality of phrases, server 102 counts a number of times each phrase is included in the target section of the job descriptions of each job category of the plurality of job categories. Server 102 maps sections of a particular job description, in dataset 222, to sections in the maintained list of sections in any way, including exact match, fuzzy match, and meaning matches using knowledge graphs such as the skill knowledge graphs described in detail below. According to an embodiment, server 102 stores identified mappings between sections of a job description and sections in the maintained list, and uses this mapping data when identifying mappings for sections of other job descriptions.

To illustrate, server 102 identifies a plurality of phrases (including noun, verb, and adjective phrases) within job description dataset 222, which includes the following phrases: "ideal candidate", "CAD", "patient charts", "C++", and "Microsoft Word". In this example, job description dataset 222 includes 10,000 job descriptions. Furthermore, in this example, the list of job description sections includes "Competencies", "Tools and Technologies", and "Duties and Responsibilities", and the plurality of job categories includes "nursing", "architecture", and "software developer". Server 102 determines that the section- and job category-specific counts for the example phrases are indicated in FIGS. 6A-6C.

4.5.2.1 Selectivity Values

Based on the calculated phrase counts for each phrase as indicated in FIGS. 6A-6C, server 102 calculates, for each section, a section- and job category-specific selectivity value that indicates how selective the phrase is for the target section of the target job category.

According to an embodiment, section- and job category-specific selectivity values are TF-IDF values. (For additional information about TF-IDF, see Hand, David J., and Niall M. Adams. "Data Mining." Wiley StatsRef: Statistics Reference Online (2014): 1-7—referred to herein as the "TF-IDF Reference", which is hereby incorporated by reference as if fully set forth herein.) A TF-IDF value measures how relevant a phrase is to one or more target documents in a collection of documents based on how often the phrase appears in the one or more target documents and how common the phrase is within the rest of the collection of documents. A TF-IDF value for a given phrase approaches 0 when the phrase is not unique to the one or more target documents, and increases in value when the phrase is concentrated in the one or more target documents and is generally not found within documents, in the collection, other than the target documents.

In this embodiment, server 102 calculates section- and job category-specific TF-IDF values, for each phrase identified from dataset 222, where the target documents are the particular section of job descriptions associated with the particular job category. Thus, the TF-IDF value for a given phrase with respect to a particular section of job descriptions associated with a particular job category, in light of the entire dataset 222, provides job category-wise information about the distribution of that phrase in the given section within the dataset.

An example overview of section- and job category-specific selectivity value calculation using TF-IDF is indicated below:

A. For each section of the list of job description sections:
   1. For each phrase of the plurality of phrases ($t_i \in T$) identified in dataset 222 (D):
      a. For each job category $c_j$ in the list of job categories, compute $\text{tf-idf}_{t_i,c_j}$:

$$\text{tf-idf}_{t_i,c_j} = \text{freq}_{t_i,c_j} \times \text{inv\_freq}_{t_i,D}$$

where $\text{freq}_{t_i,c_j}$ is the frequency of phrase $t_i$ within the target section of job descriptions associated with the specific job category $c_j$, and where $\text{inv\_freq}_{t_i,D}$ is the inverse frequency of phrase $t_i$ within the target section of job descriptions of dataset 222. The term $\text{freq}_{t_i,c_j}$ is higher the more common phrase $t_i$ is within the target section of job descriptions associated with the specific job category $c_j$ (e.g., the raw count of instances of phrase $t_i$ within the target section of job descriptions associated with the specific job category $c_j$). The term $\text{inv\_freq}_{t_i,D}$ approaches 0 the more common phrase $t_i$ is within the target section of job descriptions of dataset 222 (e.g., dividing the total number of job descriptions of dataset 222 that contain the target section by the number of job descriptions that contain phrase $t_i$ within the target section, and calculating the logarithm of the result).

Furthermore, other techniques that can compute document-based phrase differences could also be used to identify the section- and job category-specific selectivity values according to embodiments, such as phrase weighting techniques, vectorization techniques (e.g., semantic vectors), and categorical-categorical association analysis (e.g., Cramer's V).

4.5.2.2 Determining Selective Phrases Based on Selectivity Values

Once the section- and job category-specific selectivity values are determined for the phrases from dataset 222, server 102 identifies selective phrases for the sections of the different job categories by determining whether the section- and job category-specific selectivity value for each phrase satisfies selectivity criteria, such as the selectivity value exceeding a particular threshold. Responsive to determining that the section- and job category-specific selectivity value for a phrase within a given section and job category satisfies the selectivity criteria, server 102 includes the phrase in the set of selective phrases for the job category in the plurality of selective phrases for the given section.

4.5.3 Determining Selective Phrases Based on Selectivity Values and Skill Knowledge Graphs According to an embodiment, in connection with identifying selective phrases using statistical analysis, server 102 uses skill knowledge graph dataset 224 to identify additional selective phrases for the plurality of job categories. For example, server 102 matches selective phrases identified for a particular job category against skill names in skill knowledge graph dataset 224. According to an embodiment, server 102 identifies matches between selective phrases and skill names or other data represented in a skill knowledge graph based on one or more of: exact term matching, fuzzy matching, distances between term embeddings (as described in further detail below), etc.

Based on a match between a skill name, for example, in a particular skill knowledge graph and a given selective phrase for a particular job category, server 102 includes, in the particular set of job category-specific selective phrases, all information within the particular skill knowledge graph that is located within a threshold distance (length of the path) of the matching skill graph node, as described in detail above.

4.6 Generating a Requested Job Description

Returning to the discussion of flowchart 300, at step 306, a request to generate a job description is received, and it is determined, based on the request, that the request to generate a job description is associated with a particular job category of the plurality of job categories. For example, server 102 receives a request to generate a particular job description from client devices 130. The received request may be associated with one or more of the following for the requested job description: a job category (e.g., included in skill dependency graph dataset 224), an indication that multiple job descriptions for multiple job categories should be created (which may be indicated by a lack of parameters), at least one key phrase for the job description (such as a set of skill names), etc.

According to an embodiment, steps 308-310 are performed by server 102 in response to receiving the request to generate a job description. Specifically, at step 308, for each section type of the plurality of job description section types, a corresponding section in a generated job description is generated by including, in the corresponding section, one or more phrases from a particular set of selective phrases, specific to the particular job category, from the section-specific plurality of selective phrases for said each section type. In one embodiment, the one or more phrases are included in a set of k-nearest neighbors of a centroid vector within a vector space of the particular set of selective phrases. According to an embodiment, server 102 generates the requested job description based on job description generation instructions 208 in FIG. 2. At step 310, the generated job description is returned as a response to the request.

4.6.1 Generating Phrase Embeddings

According to an embodiment, embeddings for the section-specific selective phrases are derived from skill knowledge dataset 224. Specifically, the distances between embeddings of the selective phrases reflect distances between corresponding nodes in skill knowledge dataset 224. Nodes corresponding to selective phrases may be identified in any way, including exact term matching, fuzzy matching, and synonym matching. For example, server 102 trains a vectorizing ML model, e.g., implemented by a neural network, based on skill knowledge dataset 224 to produce a trained vectorizing ML model. Thus, embeddings for phrases derived from the trained vectorizing ML model encode the semantics reflected in the skills knowledge graphs. To illustrate, it is determined that the phrases "Microsoft Word" and "Microsoft Office" have a high frequency of co-occurrence within the sections of job descriptions in dataset 222, and as such, are closely located within skill knowledge dataset 224. Thus, the embeddings of these phrases are close together within the vector space of the embeddings.

4.6.2 Identifying Selective Phrases to Include in the Requested Job Description Based on a Centroid Vector within a Vector Space of Phrase Embeddings According to an embodiment, server 102 determines adequate text, to include in each section of the requested job description, based on a job category that is either explicitly included in the request or that is determined based on the request. A job category may be implied by a request based on the absence of any information in the request, which, e.g., causes server 102 to generate a job description for a default job category (described in further detail below), or a plurality of job descriptions for a plurality of job categories, etc.

For example, server 102 receives a request to generate a job description for the job category "Software Developer". Server 102 determines phrases to include in each section of the requested job description, from the Software Developer category-specific set of selective phrases, based on one or more centroid vectors calculated for the job category. Alternatively, these centroid vectors may be calculated in response to receiving the request. The user request for generating a job description could indicate requirements or other details at any level. For example, the user request could include a job title, or a required skill or competency. Server 102 can parse the request and imply the job category or assign a portion of the request to a section of the job description using any natural language processing techniques known to someone skilled in the art.

Selective phrases may be identified for inclusion in a requested job description in many ways. For example, the embeddings are clustered in the vector space and one representative phrase is identified from each cluster, or a centroid vector may be calculated for the vector space and k nearest neighbors are identified based on the centroid vector.

According to an embodiment, for each section of the job description, server 102 determines a centroid vector for the target section within a vector space that includes embeddings of the section- and job category-specific selective phrases associated with the target job category and the target section. (For additional information on centroid vector generation for word embeddings, see Gaetano Rossiello, et al. "Centroid-based Text Summarization through Compositionality of Word Embeddings." Association for Computational Linguistics (April 2017), which is hereby incorporated by reference as if fully set forth herein.) Server 102 uses one or more centroid vectors, as described in further detail below, to identify which phrases to include in the generated job description.

4.6.2.1 Calculating a Centroid Vector

For example, a centroid vector (V) may be represented as the sum of the embeddings (E) of the set of selective phrases ($S_{T,C}$) associated with the target job category (T) and the target section (C) as follows:

$$V = \sum_{w \in S_{T,C}} E(w)$$

According to another embodiment, server 102 generates a job description based on one or more key phrases provided with the request for a job description. If only one key phrase is included with the request, and the key phrase is not a known job category, server 102 uses the embedding of the key phrase as the centroid vector for each section-specific set of embeddings, or server 102 matches the key phrase to a known job category using any of the methods described herein.

If more than one key phrase is included with the request, then, according to an embodiment, server 102 calculates the centroid vector of the key phrases instead of calculating the centroid vector of all of the identified selective phrases for a given job category. According to another embodiment, server 102 calculates both a first centroid vector of the key phrases and a second centroid vector of all of the identified selective phrases for a relevant job category and uses, as the final centroid vector, an average of the first and second centroid vectors.

4.6.2.2 K Nearest Neighbors

Server 102 identifies a set of most-relevant phrases for a target section, from the set of selective phrases ($S_{T,C}$), based on the k nearest neighbors of the calculated centroid vector for the target section. Specifically, server 102 identifies the k phrase embeddings, within the vector space, that are nearest to the calculated centroid vector. According to an embodiment, the target number of relevant phrases for a given section (k) is section specific.

According to an embodiment, server 102 ranks the k phrase embeddings based, at least in part, on distance from the centroid vector. According to an embodiment, during generation of the requested job description, server 102 inserts phrases corresponding to the identified phrase embeddings in ranked order within the target job description section in the generated job description.

In some embodiments, without any user input, server 102 could automatically generate a job description for each of known job titles even job categories, the latter possibly useful as templates for people needing a job description for a specific position within a given job category.

4.6.2.3 Other Techniques for Phrase Identification

In some embodiments, server 102 identifies phrases to be added into a generated job description in alternative ways. For example, the embeddings for section-specific selective phrases, for a particular section, are clustered, and representatives of each of the clusters are included in the particular section of the generated job description. The phrases that are identified based on the clusters can be ranked based on the sizes of respective clusters, for example.

Alternatively, pairwise similarities between embeddings using any similarity measure known to someone skilled in the art could be used for each pair of selective phrases for a particular section. The set of descriptions to be included in the generated job description could start with the pair having the highest similarity, and more pairs could be added to the group based on their similarities to the pairs already in the group. The selected phrases eventually in the set of descriptions can be ranked by the order of being added into the set.

4.6.2.4 Deduplication of Identified Phrases

According to an embodiment, prior to generating a requested job description, server 102 performs deduplication of the phrases identified for each section of the job description. Deduplication may be performed in any number of ways. For example, when identifying the k nearest neighbors of a centroid vector, as described in detail above, server 102 identifies clusters of phrase embeddings in the vector space, where a cluster is a group of embeddings that are within a threshold semantic distance of each other as represented in the vector space. Server 102 includes, in the set of k nearest neighbors, a representative phrase from each of the k clusters nearest to the centroid vector in the vector space.

4.6.3 Generating a Requested Job Description

According to an embodiment, server 102 maintains a template for each job description section, and causes the identified phrases to be inserted into the template. For example, a section template may indicate a format/form(s)/types for the text to be included therein, including the section title and one or more text forms, such as noun phrases, full sentences, paragraphs including multiple full sentences, text length, etc. Furthermore, the template for a particular section may indicate one or more text types to include therein, such as skill names, job titles, etc. The template can be designed so that all the relevant text is included in the template, and the only "blanks" left to be filled out are selective phrases that fall into one or more of the "skill categories", as discussed above. Furthermore, the template for a particular section may indicate a format for the section, such as line alignment, font type, font size, list format, spacing between lines, etc. Furthermore, a section template may indicate one or more keywords to be included in the text for the section.

To illustrate, a template for the title section may indicate a relatively large font size for the title and require that the title be included first within the generated job description. Further, a template for the "reporting relationship" section may indicate that the section title should be bolded, and that a bulleted list of job titles should follow the section title. Further, a template for the "duties and responsibilities" section may indicate that the section title should be bolded, and that, after the title, the section includes the phrase "The ideal candidate will be responsible for:" followed by a bulleted list of sentences.

To further illustrate, server 102 receives the following non-limiting example request to generate a job description: JDG.generate("Registered Nurse":title; "Nursing":job_category; "Hospital":key_phrase; "Emergency Room": key_phrase). This example is illustrative of a request to generate a job description that includes both key phrases and a job category. In response to receiving the request, server 102 calculates a respective centroid vector, from the set of selective phrases for the job category "nursing", for each section of the job description. In this example, the centroid vector is calculated based on the provided key phrases, including "registered nurse", "hospital", and "emergency room". Inclusion of these key words will influence the content of the resulting job description such that more information about hospitals and emergency room duties will be included than might be included in the more general job description that would be generated given only the job category "nursing".

In this example request, the title is already indicated. In the absence of an explicitly indicated title, server 102 may use a default title for a determined or indicated job category for the generated job description. Furthermore, server 102 may use a job title that is associated, in dataset 224, with skill names identified for the job description. In addition, the server 102 could present a list of potential job titles in the job category for selection from a user or a user device.

Furthermore, for the job description section "Reporting relationship", the template indicates that this section should include a bulleted list of job titles (e.g., noun phrases). Server 102 calculates a centroid vector based on the provided key phrases, including "registered nurse", "hospital", and "emergency room", in the vector space for embeddings of selective phrases identified for the "nursing" category in the "Reporting relationship" section. Server 102 determines the k nearest neighbors of the centroid vector, and includes each of the selective phrases represented by the k identified embeddings in the "Reporting relationship" section, i.e., in ranked order. As the "Reporting relationship" may be expected to indicate a reporting hierarchy, server 102 can use simply the highest-ranking selective phrase, probably a job title, and identify and include a predetermined reporting hierarchy involving the job title.

To further illustrate, for the job description section "Duties and responsibilities", the template indicates that this section should include the text "The ideal candidate will be responsible for:" followed by a bulleted list of sentences. To identify content for the bulleted list of sentences, server 102 calculates a centroid vector based on the provided key phrases, including "registered nurse", "hospital", and "emergency room", in the vector space for embeddings of selective phrases identified for the "nursing" category in the "Duties and responsibilities" section. Server 102 determines the k nearest neighbors of the centroid vector, and uses a trained ML model (such as word2vec, glove, or Bert) to build sentences from the k identified embeddings. For example, a skip gram variant of the word2vec ML model is used, which is trained based on job description dataset 222.

According to an embodiment, one or more sections (such as "About the Company" sections) are wholly generated using a machine learning (ML) natural language generation model (such as BERT, GPT-2, etc.). For example, server 102 trains the ML model on the about section content from a plurality of job descriptions associated with a particular company. Then, in connection with generating a job description associated with the particular company, server 102 uses the trained ML model to predict the text of an about section for the company.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
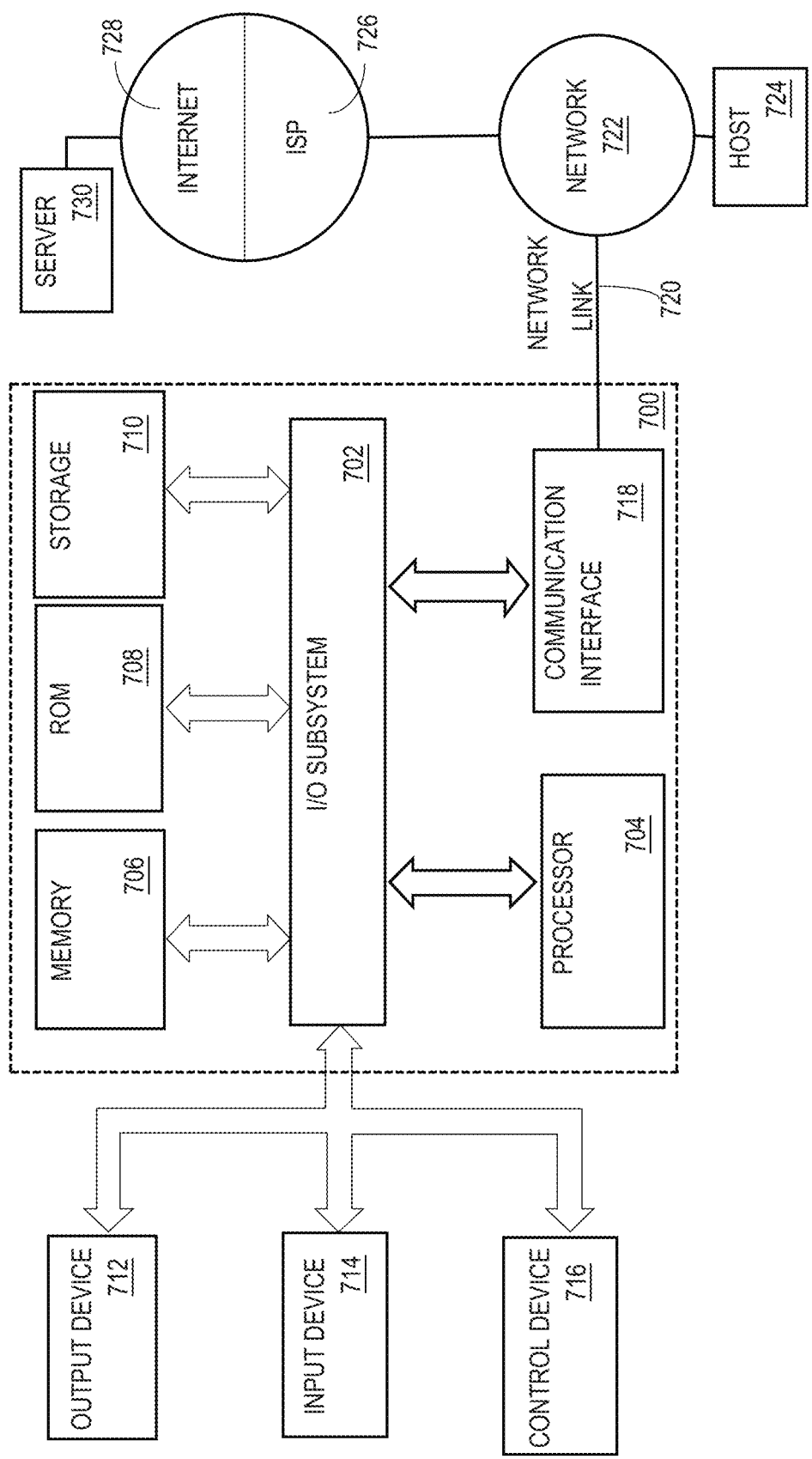
FIG. 7 is a block diagram that illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    obtaining a dependency graph for each skill name of a plurality of skill names, each dependency graph having a node for each word in said each skill name and an edge representing a syntactic relationship between words in two nodes of said each dependency graph connected by the edge;
    obtaining hypernym tree data comprising hypernym trees each including a node for each meaning of one or more meanings of a word;
    wherein at least one hypernym tree of the hypernym trees includes nodes for meanings of different words;
    assigning, to a dependency graph for a skill name of the plurality of skill names, a meaning of a specific word selected from the skill name based on the hypernym tree that includes nodes associated with the specific word; and
    building a skill knowledge graph with a plurality of skill nodes representing skill names by connecting dependency graphs based on distances between nodes of the hypernym trees for meanings that are assigned to the dependency graphs;
    performing syntactic or semantic parsing, on a plurality of job descriptions comprising text data, to identify, within the plurality of job descriptions, a plurality of phrases;
    for each job category of a plurality of job categories:
        identifying a job category-specific set of selective phrases, from the plurality of phrases, that are selective for said each job category, comprising:
            identifying a particular skill node of the plurality of skill nodes that is associated with said each job category,
            identifying one or more skill nodes that are connected, either directly or indirectly, with the particular skill node within the skill knowledge graph, and
            based on identifying the one or more skill nodes, identifying one or more phrases, corresponding to the one or more skill nodes, as selective phrases for said each job category;
        wherein the job category-specific set of selective phrases for said each job category comprises, for each section type of a plurality of job description section types, a section-specific set of selective phrases;
    receiving, by a computing system, a request to generate a new job description;
    determining, by the computing system based on the request, that the request is associated with a particular job category of the plurality of job categories; and
    in response to receiving the request:
        for each section type of the plurality of job description section types, generating, by the computing system, a corresponding section in a generated job description by including, in the corresponding section, one or more phrases from a section-specific set of selective phrases, for the corresponding section, from a particular job category-specific set of selective phrases, specific to the particular job category, and
        returning, by the computing system, the generated job description as a response to the request;
    wherein the method is performed by one or more computing devices.

2. The method of claim 1, wherein the one or more phrases for a particular section of the generated job description are included in a set of k-nearest neighbors of a centroid vector within a vector space of phrase embeddings of a particular section-specific set of selective phrases for the particular section.

3. The method of claim 2, wherein the one or more phrases for the particular section are selected based, at least in part, on ranking the set of k-nearest neighbors based on a distance of an embedding of each phrase of the set of k-nearest neighbors from the centroid vector.

4. The method of claim 2, wherein:
    the request to generate a job description comprises one or more target phrases;
    the method further comprises, in response to receiving the request, calculating the centroid vector, within the vector space of phrase embeddings of the particular section-specific set of selective phrases, based on embeddings for the one or more target phrases.

5. The method of claim 1, further comprising:
for a particular section of the generated job description:
determining that a particular phrase, in a particular section-specific set of selective phrases for the particular section, is associated with a first skill node of the plurality of skill nodes; and
in response to determining that the particular phrase is associated with the first skill node:
identifying one or more second skill nodes, of the plurality of skill nodes, that is associated with the first skill node, and
including, in the particular section, information from the one or more second skill nodes.

6. The method of claim 5, wherein one or more skill nodes are associated with meaning indicators, of one or more hypernym trees, and wherein one or more edges of the skill knowledge graph connect skill nodes with semantic relationships between meaning indicators of the skill nodes.

7. The method of claim 4, further comprising:
training a machine learning model based on the skill knowledge graph to produce a trained machine learning model; and
generating phrase embeddings for the particular section-specific set of selective phrases based on the trained machine learning model.

8. The method of claim 1, further comprising, prior to receiving the request: using one or more trained machine learning models to identify the plurality of job description section types based, at least in part, on the plurality of job descriptions.

9. The method of claim 1, further comprising:
clustering the plurality of job descriptions to produce a plurality of job description clusters;
wherein said clustering is performed based on one or more of:
embeddings of titles of the plurality of job descriptions,
embeddings of words in the titles of the plurality of job descriptions, or
embeddings of entities identified within the plurality of job descriptions;
associating each cluster, of the plurality of job description clusters, with a respective job category of the plurality of job categories;
associating the job descriptions in each job description cluster, of the plurality of job description clusters, with the job category associated with said each job description cluster.

10. The method of claim 1, further comprising:
calculating a plurality of job category-specific phrase counts by, for each phrase of the plurality of phrases, counting a number of times said each phrase is included in job descriptions of each job category of the plurality of job categories;
wherein identifying the job category-specific set of selective phrases for each job category of the plurality of job categories comprises, for particular one or more phrases of the plurality of phrases:
based on the plurality of job category-specific phrase counts, calculating a job category selectivity value that indicates how selective the particular one or more phrases are for said each job category,
determining whether the job category selectivity values for the particular one or more phrases satisfy selectivity criteria, and
responsive to determining that the job category selectivity values for the particular one or more phrases satisfy the selectivity criteria, including the particular one or more phrases in the set of job category-specific selective phrases for said each job category.

11. The method of claim 1, further comprising, in response to receiving the request, generating language for a particular section, of a particular non-skill section type, in the generated job description using a trained machine learning model that has been trained based on a plurality of section samples of the particular non-skill section type.

12. One or more non-transitory computer-readable media storing one or more sequences of instructions that, when executed by one or more processors, cause:
obtaining a dependency graph for each skill name of a plurality of skill names, each dependency graph having a node for each word in said each skill name and an edge representing a syntactic relationship between words in two nodes of said each dependency graph connected by the edge;
obtaining hypernym tree data comprising hypernym trees each including a node for each meaning of one or more meanings of a word;
wherein at least one hypernym tree of the hypernym trees includes nodes for meanings of different words;
assigning, to a dependency graph for a skill name of the plurality of skill names, a meaning of a specific word selected from the skill name based on the hypernym tree that includes nodes associated with the specific word; and
building a skill knowledge graph with a plurality of skill nodes representing skill names by connecting dependency graphs based on distances between nodes of the hypernym trees for meanings that are assigned to the dependency graphs;
performing syntactic or semantic parsing, on a plurality of job descriptions comprising text data, to identify, within the plurality of job descriptions, a plurality of phrases;
for each job category of a plurality of job categories:
identifying a job category-specific set of selective phrases, from the plurality of phrases, that are selective for said each job category, comprising:
identifying a particular skill node of the plurality of skill nodes that is associated with said each job category,
identifying one or more skill nodes that are connected, either directly or indirectly, with the particular skill node within the skill knowledge graph, and
based on identifying the one or more skill nodes, identifying one or more phrases, corresponding to the one or more skill nodes, as selective phrases for said each job category;
wherein the job category-specific set of selective phrases for said each job category comprises, for each section type of a plurality of job description section types, a section-specific set of selective phrases;
receiving, by a computing system, a request to generate a new job description;
determining, by the computing system based on the request, that the request is associated with a particular job category of the plurality of job categories; and
in response to receiving the request:
for each section type of the plurality of job description section types, generating, by the computing system, a corresponding section in a generated job description by including, in the corresponding section, one or more phrases from a section-specific set of selective phrases, for the corresponding section, from a particular job category-specific set of selective phrases, specific to the particular job category, and returning, by the computing system, the generated job description as a response to the request.

13. The one or more non-transitory computer-readable media of claim 12, wherein the one or more phrases for a particular section of the generated job description are included in a set of k-nearest neighbors of a centroid vector within a vector space of phrase embeddings of a particular section-specific set of selective phrases for the particular section.

14. The one or more non-transitory computer-readable media of claim 13, wherein the one or more phrases for the particular section are selected based, at least in part, on ranking the set of k-nearest neighbors based on a distance of an embedding of each phrase of the set of k-nearest neighbors from the centroid vector.

15. The one or more non-transitory computer-readable media of claim 13, wherein:
the request to generate a job description comprises one or more target phrases;
the one or more sequences of instructions further comprise that, when executed by one or more processors, cause, in response to receiving the request, calculating the centroid vector, within the vector space of phrase embeddings of the particular section-specific set of selective phrases, based on embeddings for the one or more target phrases.

16. The one or more non-transitory computer-readable media of claim 12, wherein the one or more sequences of instructions further comprise that, when executed by one or more processors, cause:
for a particular section of the generated job description:
determining that a particular phrase, in a particular section-specific set of selective phrases for the particular section, is associated with a first skill node of the plurality of skill nodes; and
in response to determining that the particular phrase is associated with the first skill node:
identifying one or more second skill nodes, of the plurality of skill nodes, that is associated with the first skill node, and
including, in the particular section, information from the one or more second skill nodes.

17. The one or more non-transitory computer-readable media of claim 16, wherein one or more skill nodes are associated with meaning indicators, of one or more hypernym trees, and wherein one or more edges of the skill knowledge graph connect skill nodes with semantic relationships between meaning indicators of the skill nodes.

18. The one or more non-transitory computer-readable media of claim 15, wherein the one or more sequences of instructions further comprise that, when executed by one or more processors, cause:
training a machine learning model based on the skill knowledge graph to produce a trained machine learning model; and
generating phrase embeddings for the particular section-specific set of selective phrases based on the trained machine learning model.

19. The one or more non-transitory computer-readable media of claim 12, wherein the one or more sequences of instructions further comprise that, when executed by one or more processors, cause, prior to receiving the request: using one or more trained machine learning models to identify the plurality of job description section types based, at least in part, on the plurality of job descriptions.

20. A system comprising:
one or more processors; and
one or more non-transitory computer-readable media storing one or more sequences of instructions that, when executed by the one or more processors, cause:
obtaining a dependency graph for each skill name of a plurality of skill names, each dependency graph having a node for each word in said each skill name and an edge representing a syntactic relationship between words in two nodes of said each dependency graph connected by the edge;
obtaining hypernym tree data comprising hypernym trees each including a node for each meaning of one or more meanings of a word;
wherein at least one hypernym tree of the hypernym trees includes nodes for meanings of different words;
assigning, to a dependency graph for a skill name of the plurality of skill names, a meaning of a specific word selected from the skill name based on the hypernym tree that includes nodes associated with the specific word; and
building a skill knowledge graph with a plurality of skill nodes representing skill names by connecting dependency graphs based on distances between nodes of the hypernym trees for meanings that are assigned to the dependency graphs;
performing syntactic or semantic parsing, on a plurality of job descriptions comprising text data, to identify, within the plurality of job descriptions, a plurality of phrases;
for each job category of a plurality of job categories:
identifying a job category-specific set of selective phrases, from the plurality of phrases, that are selective for said each job category, comprising:
identifying a particular skill node of the plurality of skill nodes that is associated with said each job category,
identifying one or more skill nodes that are connected, either directly or indirectly, with the particular skill node within the skill knowledge graph, and
based on identifying the one or more skill nodes, identifying one or more phrases, corresponding to the one or more skill nodes, as selective phrases for said each job category;
wherein the job category-specific set of selective phrases for said each job category comprises, for each section type of a plurality of job description section types, a section-specific set of selective phrases;
receiving, by the one or more processors, a request to generate a new job description;
determining, by the one or more processors based on the request, that the request is associated with a particular job category of the plurality of job categories; and
in response to receiving the request:
for each section type of the plurality of job description section types, generating, by the one or more processors, a corresponding section in a generated job description by including, in the corresponding section, one or more phrases from a section-specific set of selective phrases, for the corresponding section, from a particular job category-specific set of selective phrases, specific to the particular job category, and returning, by the one or more processors, the generated job description as a response to the request.

* * * * *